United States Patent [19]

Lundblad et al.

[11] Patent Number: 5,162,788
[45] Date of Patent: Nov. 10, 1992

[54] CHUNKY PLANAR DATA PACKING APPARATUS AND METHOD FOR A VIDEO MEMORY

[75] Inventors: James A. Lundblad, Santa Clara; Mohammed Sriti, San Jose; Anthony D. Masterson, Cupertino, all of Calif.

[73] Assignee: Apple Computer, Inc., Cupertino, Calif.

[21] Appl. No.: 368,379

[22] Filed: Jun. 16, 1989

[51] Int. Cl.$^5$ .............................................. G09G 1/02
[52] U.S. Cl. ..................................... 340/799; 340/703
[58] Field of Search ............... 340/701, 703, 723, 724, 340/727, 731, 750, 799; 382/47

[56] References Cited

U.S. PATENT DOCUMENTS

| | | | |
|---|---|---|---|
| 4,074,254 | 2/1978 | Belser et al. | 340/799 |
| 4,125,873 | 11/1978 | Chesarek | 340/799 |
| 4,580,134 | 4/1986 | Campbell et al. | 340/703 |
| 4,598,283 | 7/1986 | Tung et al. | 382/47 |
| 4,602,285 | 7/1986 | Beaulier | 382/47 |
| 4,712,140 | 12/1987 | Mintzer et al. | 382/47 |
| 4,829,453 | 5/1989 | Katsuta et al. | 382/47 |
| 4,884,069 | 11/1989 | Farand | 340/799 |
| 4,888,582 | 12/1989 | Schnarel | 340/703 |

Primary Examiner—Alvin E. Oberley
Assistant Examiner—Richard Hjerpe
Attorney, Agent, or Firm—Blakely, Sokoloff, Taylor & Zafman

[57] ABSTRACT

An apparatus and method for taking data that is presented on a NUBUS in NUBUS format and writing it into a video memory in chunky planar format, is described. The present invention is also useful for performing RGB reads wherein video data is read from the video memory in chunky planar format and is translated into NUBUS format for transmission across the NUBUS. The apparatus comprises a data format translator which is coupled to the NUBUS for translating the RGB data from NUBUS format to chunky planar format. The translated RGB data in chunky planar format is compressed and rearranged as compared to the NUBUS format—resulting in a more efficient utilization of video memory space. An address generator is also coupled to the video memory for calculating the address location in the video memory where the translated RGB data is to be written. The address location is derived from the NUBUS address according to the formula $N_{start}=(3*NAD/4)$ where $N_{start}$ is the start address in video memory and NAD represents the NUBUS address from which the RGB data to be translated is obtained.

18 Claims, 4 Drawing Sheets

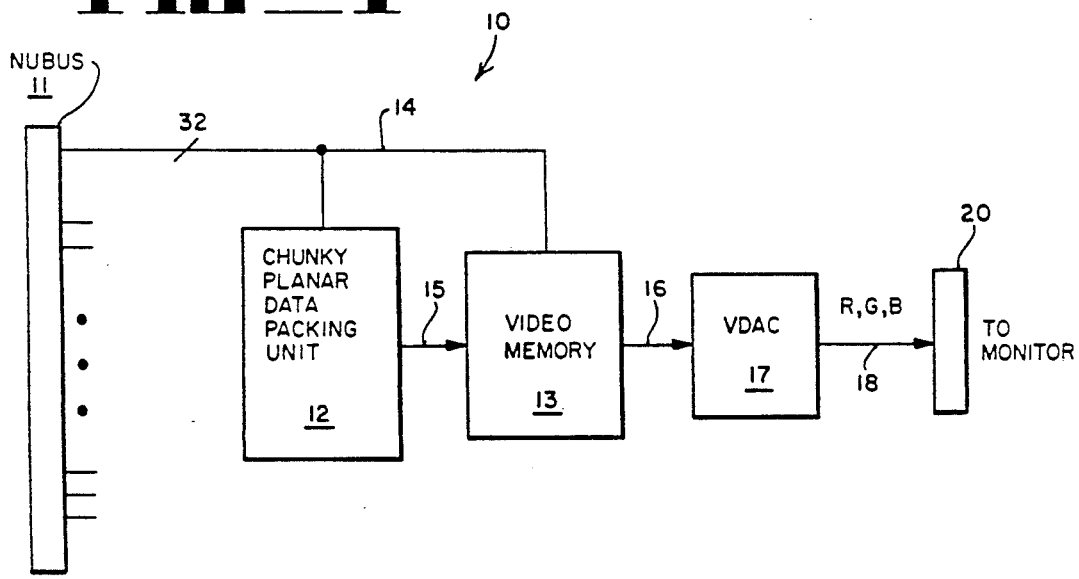
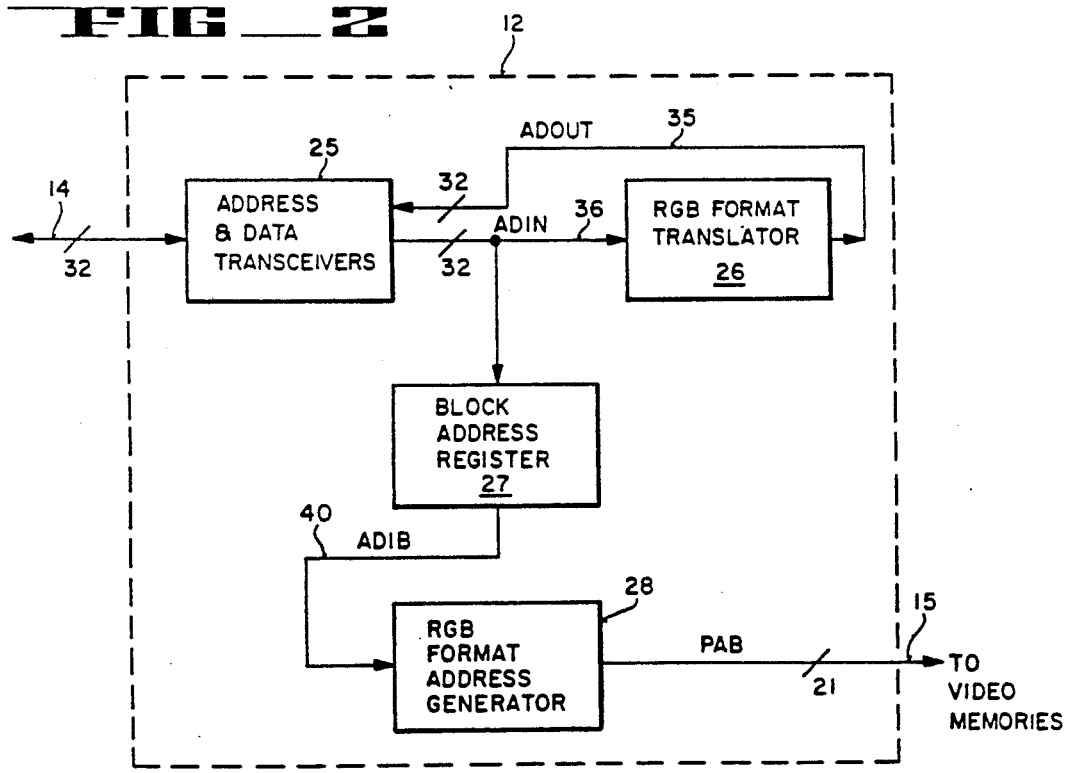

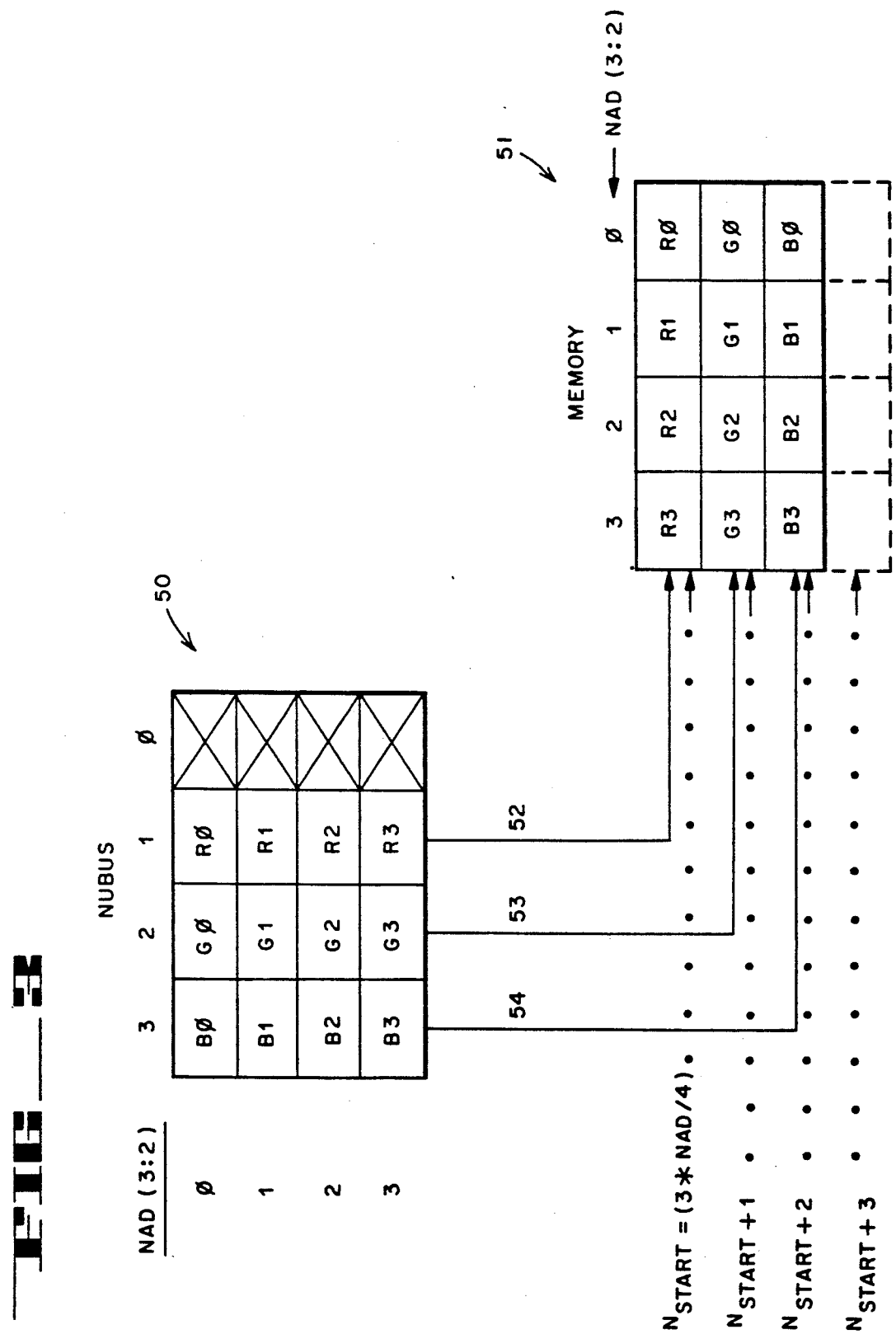

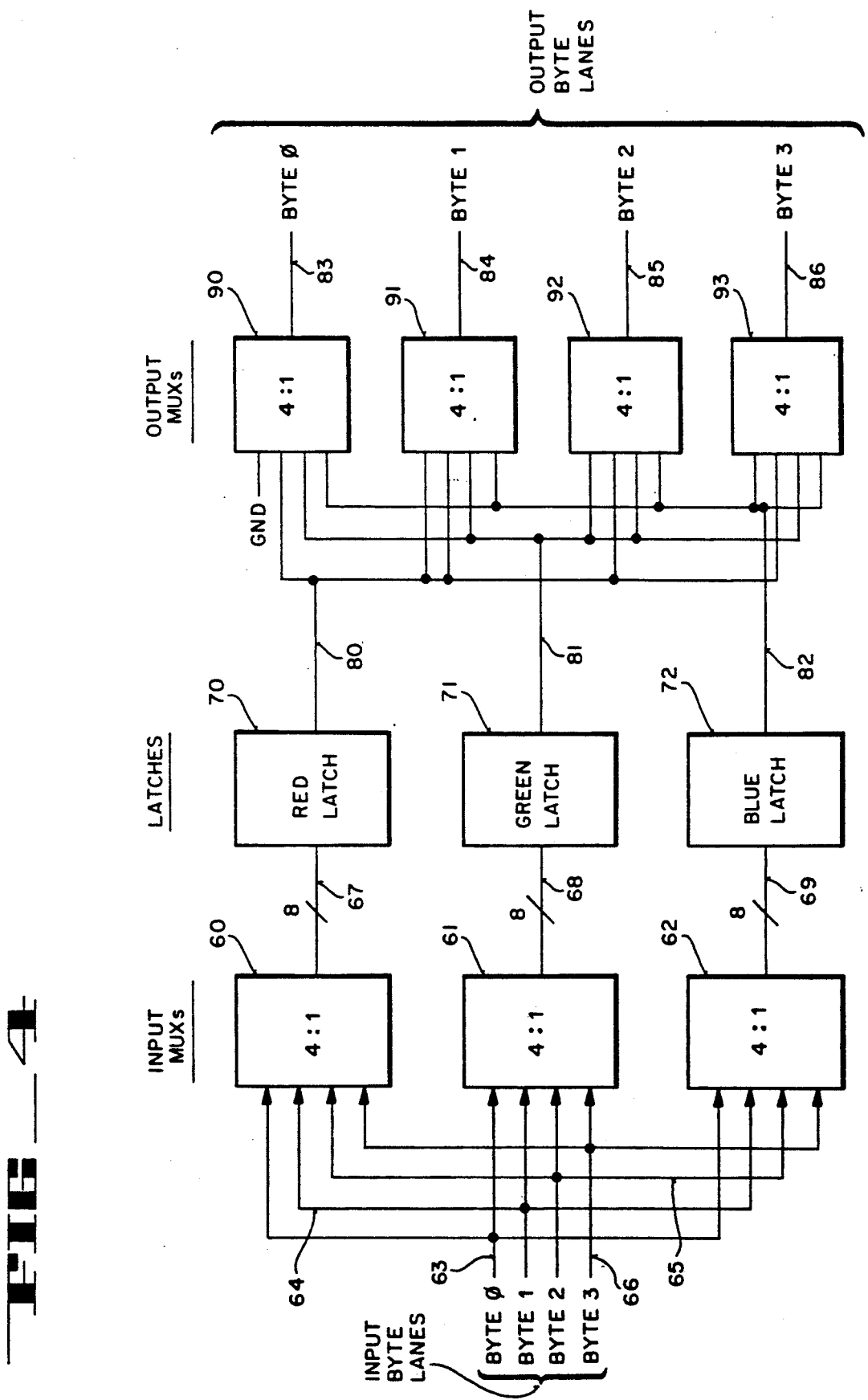

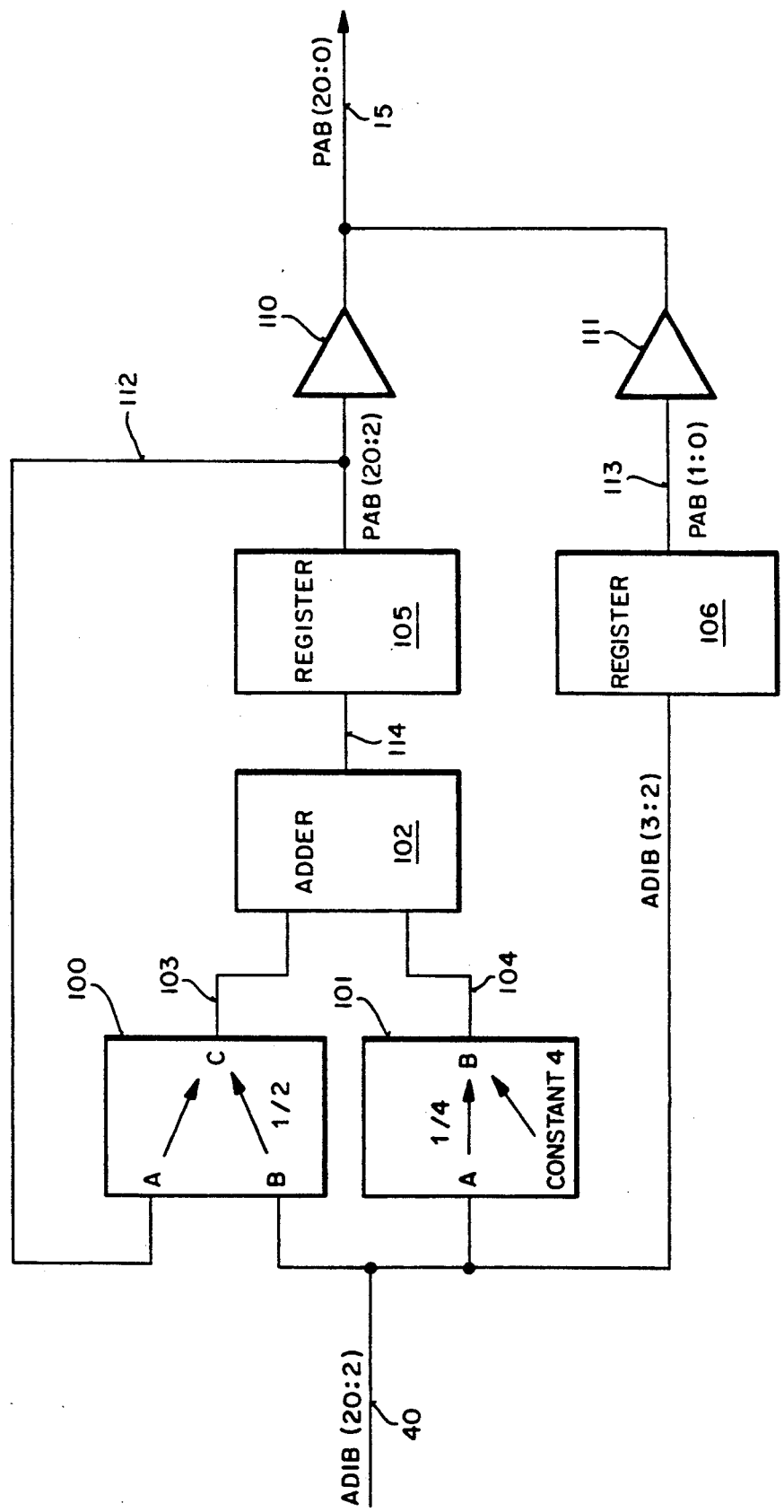

CHUNKY PLANAR DATA PACKING APPARATUS AND METHOD FOR A VIDEO MEMORY

FIELD OF THE INVENTION

This invention relates to the field of semiconductor memories; in particular, to the packing of video data in those memories.

BACKGROUND OF THE INVENTION

Video random-access memories (VRAMs) have recently found widespread use in microprocessor-based computers providing video graphics signals. These VRAMs are commonly incorporated into a video card which is coupled to the central processing unit (CPU) which is located on the motherboard of the computer. Such a video card is described in co-pending application Ser. No. 07/027,847, filed Mar. 19, 1987, entitled "Video Apparatus Employing VRAMs", which is assigned to the assignee of the present invention.

For bit-mapped graphics applications, each atomic position in the graphical display is called a "pixel", and each pixel itself has a unique address. Pixel data can be any length ranging from one to any finite number of bits. The addressing space in bit-mapped graphics is referred to as row and column indexes. A typical CRT display is a 640×400 pixel array, with a black and white pixel being represented as 1-bit, and a color pixel as a plurality of bits. According to this method the individual memory locations are referenced by their VRAM position in the addressing space.

A video card is conventionally plugged into one of a plurality of board slots located within the computer's cabinet. These slots are usually coupled to the CPU along some type of 32-bit bus. In the preferred embodiment, the video card is coupled to the computer's CPU along a "NUBUS" bus ("NUBUS" is a trademark of Texas Instruments, Inc.). The video card, as mentioned, engages one of the slots in the computer and communicates with the NUBUS. The output of the video card comprises a video signal which may include red, green and blue (RGB) color information. This video signal is then coupled to a video monitor for display thereon.

Conventionally, RGB color information is stored as 3 consecutive bytes (one byte for each color element) for a total of 24 bits. This presents a problem since the bus connecting the CPU to the video card is typically 4 bytes, i.e., 32-bits, wide. For instance, data transfer across the NUBUS commonly occurs in four byte transfers. This means that whenever 24-bit (3 byte) RGB graphics data is transferred across the NUBUS one byte is wasted. In other words, one byte of the NUBUS always remains unused or vacant during transfer of a 24-bit RGB quantity.

In the past, data transferred across the NUBUS was typically loaded directly into VRAM in a one-to-one correspondence scheme. That is, each word of data at a given NUBUS address was written to the corresponding video memory location in the same format (i.e., NUBUS format). Unfortunately, this scheme results in an inefficient use of video memory space since one byte out of every four bytes that is transferred always remains unused. What is needed then is a more efficient way of packing 24-bit RGB data in video memory which eliminates data vacancies.

As will be seen, the present invention provides a novel way of taking 24-bit RGB data that is presented on the NUBUS and packing it into video memory in a more efficient manner which eliminates data vacancies. It does this by compressing and rearranging the RGB data presented on the NUBUS, and by translating the NUBUS addresses to video memory addresses using a specialized algorithm.

SUMMARY OF THE INVENTION

An apparatus and method for taking data that is presented on a 32-bit bus (e.g., NUBUS) in one format and writing it into a video memory in chunky planar format, is described. The present invention is also useful for performing RGB reads wherein video data is read from the video memory in chunky planar format and is translated into NUBUS format for transmission across the NUBUS. Chunky planar format represents a more efficient way of packing data in video memory to eliminate vacancies in the sequence of bytes.

According to one embodiment, the apparatus comprises a data format translator which is coupled to the NUBUS for translating the RGB data from NUBUS format to chunky planar format. The translated RGB data in chunky planar format is compressed and rearranged as compared to the NUBUS format. The translator presents the translated RGB data (in chunky planar format) to the video memory for storage therein.

An address generator is also coupled to the video memory for calculating the address location in the video memory where the translated RGB data is to be written. The address location is derived from the NUBUS address according to the formula $N_{start} = (3 \cdot NAD/4)$ where $N_{start}$ is the start address in video memory and NAD represents the NUBUS address from which the RGB data to be translated is obtained. Control logic coupled to both the translator and the address generator controls the operation of the apparatus so that a single byte is translated in a single memory cycle.

The process of writing RGB data from NUBUS to video memory is initiated when a NUBUS address is received from the NUBUS. That address is then translated to a start address in video memory according to the above formula. Next, the individual data byte to be translated is obtained from the NUBUS and a memory cycle is initiated to write that data into the memory at the specific memory address and byte location calculated by the address generator.

Other aspects of the present invention will be apparent from the detailed description.

BRIEF DESCRIPTION OF THE DRAWINGS

The present invention will be understood more fully from the detailed description given below and from the accompanying drawings of the preferred embodiment of the invention, which, however should not be taken to limit the invention to the specific embodiment but are for explanation and understanding only.

FIG. 1 is a generalized block diagram of a video card connected to a NUBUS slot. The diagram illustrates the relationship of the present invention to other relevant devices present on the video card.

FIG. 2 is a block diagram of the currently preferred embodiment of the present invention.

FIG. 3 illustrates the differences between the NUBUS format for storage of RGB video data and the chunky planar format generated by the present invention.

FIG. 4 is a logic diagram of the RGB format translator utilized in the currently preferred embodiment of the present invention.

FIG. 5 is a block diagram of the RGB address generator utilized in the currently preferred embodiment of the present invention.

DESCRIPTION OF THE PREFERRED EMBODIMENT(S)

An apparatus and method for taking data that is presented on a 32-bit bus and packing it into video memory in a more efficient manner is described. In the preferred embodiment, the 32-bit bus coupled to the presently invented apparatus is a NUBUS. However, it should be understood that other 32-bit buses, having other associated formats, could also be used without departing from the spirit or scope of the present invention.

The new video memory data format is referred to as "chunky planar" to distinguish it from the well-known NUBUS data format. The present invention is useful for taking red, green and blue (RGB) data presented on a 32-bit bus and packing it into VRAM in chunky planar format, and also for taking chunky planar data and translating it back to 32-bit bus format for subsequent transfer across the 32-bit bus.

In the following description, numerous specific details are set forth such as specific bit lengths, addresses, etc., in order to provide a thorough understanding of the present invention. It will be obvious, however, to one skilled in the art that the present invention may be practiced without these specific details. In other instances, well-known circuits are not set forth in detail so that the present invention is not unnecessarily obscured.

Referring to FIG. 1, a generalized block diagram of a video card 10 is shown. (Only those components needed to understand the present invention are shown on card 10 for clarity reasons.). Video card 10 comprises a NUBUS connector 11 which provides electrical connection to the computer's CPU across the NUBUS. Coupled to the NUBUS is a 32-bit internal data bus 14. Bus 14 is bi-directional and couples the NUBUS to chunky planar data packing unit 12 and video memory 13. As address and data information is presented by the NUBUS to video card 10, it appears on bus 14 in NUBUS format. Because bus 14 is bidirectional, memory 13 can transfer RGB data to unit 12 for translation back to NUBUS format. More details of the operation of unit 12 and memory 13 will be discussed later.

When performing an RGB write, video data transferred across the NUBUS is presented to video card 10 for storage in video memory 13. In this operation, video address and data information is presented to unit 12 along bus 14. Chunky planar data packing unit 12 rearranges and compresses the video data presented to it in NUBUS format and subsequently delivers the video data (now in chunky planar format) to video memory 13 along bus 14. Address information is provided to memory 13 on primary address bus 15. Before unit 12 performs the data translation, it generates video memory addresses for the storage of the RGB data. As mentioned, the video addresses are delivered to memory 13 along primary address bus (PAB) 15.

Eventually, the video data written into memory 13, is delivered to video digital-to-analog convertor (VDAC) 17 along bus 16. VDAC 17 converts the digitally encoded display information into red, green and blue analog video signals. These signals are provided at monitor connector 20 along line 18. Connector 20 couples the video card to the CRT monitor for display of the RGB video data thereon.

Referring now to FIG. 2, a block diagram of chunky planar data packing unit 12 is shown. During an RGB write to memory, NUBUS address and data information is presented to address and data transceivers 25 along 32-bit bus 14. Transceivers 25 couple the data and address information onto address and data input bus (ADIN) 36. Bus 36 is also 32-bits wide and couples transceivers 25 with RGB format translator 26 and block address register 27.

Format translator 26 is utilized to translate the data presented on bus 36 into chunky planar data format (in the case of an RGB write to memory) or, alternatively, to NUBUS format (when performing an RGB read from memory to NUBUS). The translated data is provided on address and data output bus (ADOUT) 35, which is also 32-bits wide. Bus 35 is coupled to transceivers 25 which, in turn, presents the translated data to video memory 13 along internal bus 14.

Block address register 27 is utilized to temporarily store the address information present on bus 36 until RGB format address generator 28 can receive it. Register 27 is coupled to the RGB format address generator 28 along address input bus (ADIB) 40. The video memory addresses are produced by generator 28 on primary address bus 15 which is a 21-bit dedicated bus coupled to video memory 13.

The following sequence of events describes the operation of data packing unit 12 for the case of an RGB write to video memory (i.e., data is being transferred from NUBUS to memory).

First of all, unit 12 receives the address of the first word (a word being 4-bytes or 32-bits in length) to be written from the NUBUS. That address is then latched into address register 27. Next, the latched address is translated to a start address for the video memory. Address translations are performed by RGB format address generator 28.

Following the translation of the address, the actual RGB data is received by translator 26 in NUBUS format across bus 14. Individual bytes of the data are presented at the output byte lanes of translator 26 (the term "byte lane" refers to a column of bytes spanning across multiple addresses. For example, in FIG. 3 byte lane 1 spans addresses 0–3 and includes data bytes R0–R3). A memory cycle is then initiated using the start address produced by generator 28 for the first of up to three data bytes. (In NUBUS format, byte zero of the data word is ignored since it does not contain video data).

After the first data byte has been written into the video memory, a new memory cycle may be started to translate the next address and the next data byte. A final memory cycle translates the last address and the last data byte in the NUBUS word.

It should be understood that if the NUBUS writes less than a word then only 1 or 2 bytes may be written. In other words, the NUBUS may present the video card with a vacant data byte from byte lane zero (see FIG. 3). After the first NUBUS word has been translated the above-described process is repeated for the remaining words in the NUBUS block.

Referring now to FIG. 3, the translation of NUBUS data block 50 into video memory block 51 is shown. Block 50 is in NUBUS format, while block 51 is packed in chunky planar format. The NUBUS addresses are designated by bits 3 and 2 of bus 40, i.e., NAD (3:2). NUBUS address 0 references data bytes of B0, G0 and R0; in byte lanes 3, 2 and 1, respectively. NUBUS address 1 references data bytes B1, G1 and R1, and so on. Note that byte lane 3 of block 50 contains all of the blue color data; byte lane 2 stores all the green color data, and byte lane 1 stores all the red color data. Byte lane 0 of block 50 is unused and contains no video data.

According to the present invention, the four bytes stored in NUBUS byte lane 1 (e.g., R0, R1, R2 and R3) are rearranged and stored in a single word of video memory; for example, at start address $N_{start}$. Arrow 52 depicts how byte lane 1 of NUBUS block 50 is translated into address location $N_{start}$ of memory block 51. In a similar manner, NUBUS byte lane 2, containing green video data, is packed into address location $N_{start+1}$, as shown by arrow 53. Arrow 54 illustrates how byte lane 3, containing blue color information, is translated to address location $N_{start+2}$.

As is clearly shown in FIG. 3, memory block 51 contains all of the color information of NUBUS block 50. Importantly, however, the data in block 51 is compressed and rearranged as compared to block 50, thereby eliminating the memory area normally consumed by vacant byte lane 0. For instance, byte lane 0 of memory block 51 contains R0, G0 and B0 video data which corresponds to the data stored in block 50 at NUBUS address 0. RGB data stored at NUBUS address 1 is written into memory block 51 in byte lane 1, and so on.

Essential to the operation of the currently preferred embodiment of the present invention is that each NUBUS address is translated to a start address in video memory according to a certain algorithm. In the algorithm, the NUBUS address is first divided modulo 4 and then multiplied by 3. Mathematically, this operation can be written as $N_{start}=(3* NAD/4)$, where $N_{start}$ represents the start address in memory and NAD is the NUBUS address.

Assume that block 50 of FIG. 3 is to be translated. Applying the above formula, a start address in video memory of 0 is first derived from a NUBUS address 0. The data byte R0 is then received from format translator 26 (via the NUBUS and bus 14) in a memory cycle which writes the data in byte lane 0 of address location 0 in memory block 51.

Next, the video memory address is incremented to $N_{start+1}$ and another memory cycle is performed. This transfers the byte corresponding to G0 from NUBUS block 50 to byte lane 0 of address location $N_{start+1}$. The third memory cycle transfers the byte B0 to byte lane 0 at address location $N_{start+2}$. The entire process is repeated for NUBUS address locations 1, 2 and 3 to fill the remaining portions of video memory block 51. (Because of the integer nature of the division in the above algorithm, it is appreciated that the start address for each NUBUS address in block 50 is zero.)

With reference now to FIG. 4, a logic diagram of the RGB format translator of the currently preferred embodiment of the present invention is shown. Translator 26 comprises a set of 4-to-1 input multiplexers (i.e., 60, 61 and 62), a set of latches (i.e., 70, 71 and 72) and a set of 4-to-1 output multiplexers (i.e., 90, 91, 92 and 93). Connected to each of the 4:1 input multiplexers are the individual byte lanes of the NUBUS. For instance, byte lane 0 is presented on line 63 to multiplexers 60, 61 and 62, byte lane 1 is presented on line 64, byte lane 2 is presented on line 65, and byte lane 3 is presented on line 66. During an RGB write these input byte lanes comprise the corresponding byte lanes of the NUBUS. Conversely, in performing an RGB read, they represent the byte lanes of video memory 13.

The output of multiplexer 60 is connected along an 8-bit bus 67 to red latch 70. Similarly, multiplexers 61 and 62 are coupled along lines 68 and 69 to green latch 71 and blue latch 72, respectively. The outputs of each of the latches are coupled to the inputs of the output multiplexers 90 through 93. Thus, red color information from red latch 70 is presented on line 80, green color information from green latch 71 is presented on line 81, and blue color information from blue latch 72 is presented on line 82. The output lines 83 through 86 of multiplexers 90 through 93 provide the output byte lanes 0 through 4, respectively, of the translator.

When performing an RGB write to video memory, format translator 28 selectively couples the appropriate red, green or blue bytes from the input byte lanes to the output byte lanes for storage in video memory. Control for the multiplexers and latches of FIG. 4 is provided by well known combinatorial circuits and state machine logic which is not shown for sake of simplicity.

In the translation sequence described above (see FIG. 3), the first byte written to memory during an RGB write is red. For example, red data byte R0 present on byte lane 1 of block 50 is coupled to input multiplexers 60 through 62 along data input line 64. Multiplexer 60 selects pin 64 to couple R0 into red latch 70 along line 67. Initially, all of the 4:1 output multiplexers select line 80, which is output from red latch 70, for the first memory cycle. Thus, all four of the output byte lanes contain R0 video data. Address generator 28 determines where in memory the R0 byte is actually written. (Each byte in the memory is separately controllable thereby allowing generator 28 to control the destination of each byte, e.g., which byte lane to write to).

While all four output byte lanes contain color information for a single color at a given point in time, only one of the byte lanes is written in video memory. This process is repeated for the green and the blue color data in the following 2 memory cycles. For example, byte G0, which gets latched into green latch 71, is provided on line 81 to output multiplexers 90 through 93. Each of these multiplexers then selects the green value for output onto output byte lanes 0 through 3. Generator 28 then selects byte lane 0 as the destination for the G0 color data.

Importantly, each memory cycle accesses a separate word on the NUBUS. However, only 3-bytes out of the word actually end up being transferred to video memory. In other words, individual memory cycles provide single word accesses from the NUBUS. In an alternative embodiment, NUBUS block mode capabilities may be taken advantage of to perform multiple word transfers in a single memory cycle.

The translator of FIG. 4 is also useful when performing RGB reads; that is, translating data from video memory to the NUBUS. For the case of an RGB read, the input byte lanes now correspond to the byte lanes in the video memory. Specific byte lanes in memory are accessed three successive times. For instance, each of the input multiplexers 60 through 62 might initially select byte lane 0. Afterwards, three successive memory cycles are performed—the first one being for the red color data, the second one for the green and the third for the blue color data. This effectively loads the color information into respective latches 70 through 72. Output multiplexers 90 through 93 then select the appropriate color information to be transferred to the associated byte lanes on the NUBUS. For example, multiplexer 91 selects the red color data for transfer to byte lane 1, multiplexer 92 selects green color data for transfer onto byte lane 2 and multiplexer 93 selects blue color data for transfer to byte lane 3. Note that multiplexer 90 has one of its input pins grounded. This is because the output of multiplexer 90 is coupled to byte lane 0. Keep in mind that when performing an RGB read, byte lane 0 on the NUBUS does not contain usable video data.

Referring now to FIG. 5, a block diagram of RGB address generator 28 is shown. To assist in understanding the operation of address generator 28, consider the following sequence of events.

Assume that NUBUS data block 50 (see FIG. 3) is being written into block 51 of video memory. Block 50 comprises a group of four words stored in four addressable memory locations. These memory locations are represented by addresses 0-3. Each word in block 50 gets 3 out of 4 bytes written out of it. Those 3 bytes are translated to comprise a single byte lane in video memory 51—the byte lanes spanning three separate memory addresses. Therefore, the address of the word in block 50 determines which byte lane in memory block 51 that word is going to be packed into. For instance, word 3 is packed into byte lane 3 in memory block 51, and so on. Thus, there are 4 byte lanes in memory corresponding to to the 4 words (at separate address locations) on the NUBUS.

The least two significant bits of the word address on the NUBUS, i.e., NAD (3:2), determine the destination byte lane in video memory, as there is a one-to-one mapping between the four locations on the NUBUS and the 4 byte lanes in memory. (It should be noted that bits 1 and 0 on the NUBUS, i.e., NAD (1:0), represent the byte address. Since we are only dealing with the word address in data packing unit 12, bits 0 and 1 are ignored).

In FIG. 5, the NUBUS address information is supplied to generator 28 along the address and data input bus 40 e.g., ADIB (20:2). The lower-order 2-bits of bus 40 are coupled to register 106. These two lower-order bits represent the word address for NUBUS block 50 (e.g., NAD (3:2)) and therefore, provide the information as to which byte lane in memory a data byte will be stored. The output of register 106 is coupled to a buffer 111 along line 113. These two bits are now labelled as the two lower-order bits on the primary address bus 15, i.e., PAB (1:0), and represent the byte lane address. These two lower-order bits are combined with the upper nineteen bits to produce all 21 bits of primary address bus 15.

The next part of the address generation process involves calculating the correct start address in video memory. Because the 3-bytes of a NUBUS word are written into a byte lane in memory, the 3-bytes are placed into three successive addresses in memory beginning at the start address. Once the start address is determined, the subsequent addresses for the next bytes are easily calculated by incrementing the start address.

Consider the situation in which packing unit 12 begins translating data from the base of the NUBUS. In this case, the start address is going to be the first location in memory. In other words, there is always a correspondence between address 0 in the NUBUS and address 0 in video memory. The first four locations on the NUBUS, e.g., words 0, 1, 2 and 3, always have a start address of 0 in the video memory since the data that is to be transferred is simply R0, R1, R2, R3, G0, G1, G2, G3, etc. A new start address will not be generated until the NUBUS increments beyond the first four words. After the first block of NUBUS data has been packed into the video memory, translation of the second block—containing addresses 4, 5, 6 and 7—may proceed. For the second block, the correct start address for the next translation is the third word in memory, i.e., $N_{start+3}$, as shown in FIG. 3.

Mathematically, the start address in video memory can be seen as the NUBUS address divided by modulo 4 and multiplied by 3. For the example given above, if the first address in the NUBUS block is 4, then the start address in video memory for the translation is given as $3*4/4=3$; address 3 in video memory is the start address for a NUBUS translation beginning at address 4 (in block 50). In address generator 28, this translation algorithm is implemented by blocks 100, 101, 102, 105 and their associated connections.

Bits 4 through 20 of bus 40 are presented to the B input of block 100 and the A input of block 101. Block 100 contains a divider which divides the address by ½, as well as a multiplexer to select either path B-to-C or path A-to-C. The multiplexer is controlled by logic means and state machines not shown in FIG. 5. Similarly block 100 contains a divider which divides by 4. A multiplexer is also provided to select either the path A-to-B (which divides by 4) or a separate path which provides a constant value 4 to the output of pin B. Output pin C of block 100 is coupled to adder 102 through line 103 while output pin B of block 101 is coupled to the adder along line 104. Block 101 is controlled in a similar manner as block 100.

When calculating the start address for translation, blocks 100 and 101 select paths B to C and A to B, respectively. In this way the address provided by bits 4 through 20 of bus 40 is multiplied by ½ and also multiplied by ¼. Adding the quantities on line 103 and 104 produces an address which is 3 times the NUBUS address divided by 4 (i.e., $N_{start}=(3*NAD/4)$). This result is provided by adder 102 on line 114, which is then presented to register 105. Thus, line 112 contains the primary address bus bits 20 through 2. This start address is buffered from bus 15 by buffer 110. Primary address bus 15 combines the address information on line 112 and line 113 to produce the start and byte lane information needed for the address location in video memory.

To calculate the next address location in memory all that needs to be done is to add 1-word, i.e., $N_{start+1}$. This is accomplished by the feedback connection of line 112 back to the A input of block 100. After the start path from input A-to-C. In other words the start address is transferred from line 112 to line 103. At the same time the multiplexer in block 100 selects the path which transfers the constant 4 to the output B on line 104. Therefore, adder 102 adds the start address plus 4 (i.e., 4 bytes) to produce the next memory address in the sequence, i.e., $N_{start+1}$, on line 114. The upper order bits are then combined with the lower order bits on primary address bus 15 as described above.

It should be appreciated that during the RGB read, essentially the same address translation takes place. This is because during a read we always start at the start address and read three locations in an identical manner to an RGB write. The entire sequence of events that occurs during an RGB read can be summarized as follows.

First, the address is obtained from the NUBUS and translated into the start address $N_{start}$ and a memory cycle is initiated. That memory cycle produces a byte from memory. Another memory cycle is then initiated using the next address $N_{start+1}$. As the data bytes are read from video memory 13 they are provided to the translator 26 within packing unit 12 along bidirectional bus 14. These data bytes are then translated and presented to the NUBUS.

Whereas many alternations and modifications of the present invention will no doubt become apparent to a person of ordinary skill in the art after having read the foregoing description, it is to be understood that the particular embodiment shown and described by way of illustration is in no way intended to be considered limiting. For example, although this disclosure has shown a particular way of transferring data across a NUBUS, other transfer methods across other 32-bit buses are also possible. Therefore, reference to the details of the preferred embodiment are not intended to limit the scope of the claims which are themselves recite only those features regarded as essential to the invention.

Thus, a data packing apparatus and method which is useful for writing data into a video memory in chunky planar format from a 32-bit bus, and for reading video data stored in a video memory in chunky planar format to a 32-bit bus, has been described.

What is claimed is:

1. In a computer providing a video signal to a monitor for display thereon, said computer including a bus coupling a central processing unit (CPU) to a video memory, an apparatus for writing red, green and blue (RGB) data supplied from said bus in a bus format into said video memory in a video memory format, said RGB data in the bus format including a series of words, each word including a red byte, a green byte, and a blue byte, said apparatus comprising:
    data format translation means coupled to said bus for translating said RGB data from the bus format to the video memory format, the translated RGB data in said video memory format being rearranged as compared to said bus format so that within each block of said video memory format, a first word includes only red bytes, a second word includes only green bytes, and a third word includes only blue bytes;
    address generator means coupled to said bus for calculating the address location in said video memory where said translated RGB data is written; and
    control means for controlling said translation means and said address generator means.

2. The apparatus of claim 1, wherein said address generator means includes calculating means for calculating a start address in said video memory according to the formula $$N_{start} = (3 * A_{ddr}/4)$$

where $N_{start}$ represents said start address in said video memory and $A_{ddr}$ represents the destination address provided on said bus for a word of said block.

3. The apparatus of claim 2, wherein said bus comprises a NUBUS.

4. In a computer providing a video signal to a monitor for display thereon, said computer including a bus coupling a central processing unit (CPU) to a video memory having 32-bit words and a block defined by 3 words each having 4 bytes in a video memory format in which a first word includes only red bytes, a second word includes only green bytes, and a third word includes only blue bytes an apparatus for reading red, green and blue (RGB) data from said video memory in the video memory format to said bus in a bus format comprising:
    data format translation means coupled to said bus for translating said RGB data stored in said video memory format in said video memory to the bus format in which each word includes a red byte, a green byte, and a blue byte;
    address generator means coupled to said bus and data format translation means for calculating the address location in said video memory where said translated RGB data is read; and
    control means for controlling said translation means and said address generator means.

5. The apparatus of claim 4, wherein said address generator means includes calculating means for calculating a start address in said video memory according to the formula $$N_{start} = (3 * A_{ddr}/4)$$

where $N_{start}$ represents said start address in said video memory and $A_{ddr}$ represents the destination address provided on said bus for a word of said block.

6. The apparatus of claim 5, wherein said bus comprises a NUBUS.

7. In a computer providing display of red, green and blue (RGB) video data on a CRT monitor, an apparatus for writing said RGB data from a NUBUS format in which each word includes a red byte, a green byte, and a blue byte to a video memory in chunky planar format in which a first word includes only red bytes, a second word includes only green bytes, and a third words includes only blue bytes said apparatus comprising:
    a data format translator having a plurality of input multiplexers for receiving said RGB data from the byte lanes of said NUBUS, a plurality of latches coupled to said input multiplexers for separately storing individual bytes of said RGB data, and a plurality of output multiplexers coupling said latches to said video memory, said translator providing one of said individual bytes to said video memory during a memory cycle;
    a red, green and blue (RGB) address generator for calculating an address location in said video memory where said individual byte is to be written, said address location being derived from a start address in said video memory according to the formula $$N_{start} = (3 * NAD(20:2)/4)$$

where $N_{start}$ represents its start address in said video memory and NAD represents the destination address provided on the NUBUS for the first word of a block of video memory; and
    control means for controlling said translator and said generator.

8. The apparatus according to claim 7, wherein said RGB address generator further comprises
    incrementing means for incrementing said start address to obtain the next address in said video memory for the storage of the next of said individual bytes in the next word of video memory.

9. In a computer providing a display of red, green and blue (RGB) video data on a CRT monitor, an apparatus for reading said RGB data from a video memory in a chunky planar format in which a first word includes only red byes, a second word includes only green bytes, and a third word includes only blue bytes, to a NUBUS in NUBUS format in which each word includes a red byte, a green byte, and a blue byte, said apparatus comprising:

a data format translator having a plurality of input multiplexers for receiving said RGB data from said video memory, a plurality of latches coupled to said input mulitplexers for separately storing individual bytes of said RGB data, and a plurality of output multiplexers coupling said latches to said NUBUS;

a red, green and blue (RGB) address generator for calculating the address location in said video memory where said individual byte is to be read from, said address location being derived from a start address in said video memory according to the formula $$N_{start} = 3*NAD(20:2)/4$$

where Nstart represents said start address in video memory and NAD represents the source address provided on the NUBUS for the first word of a block of video memory to be read; and control means for controlling said translator and said generator.

10. The apparatus according to claim 9, wherein said RGB address generator further comprises incrementing means for incrementing said start address in video memory to obtain the next address in said video memory for reading the next of said individual bytes.

11. In a computer providing a video display signal, a method of writing red, green and blue (RGB) data presented on a bus in a bus format in which each word includes a red byte, a green byte, and a blue byte into a video memory in a series of words in chunky planar format in which a block of memory is defined by a first word that includes only first color bytes, a second word that includes only second color bytes, and a third word that includes only third color bytes, said method comprising the steps of:

(a) receiving a destination address from said bus;

(b) translating said destination address to a start address for said video memory, according to the formula $$N_{start} = (3*A_{ddr}/4)$$

where $N_{start}$ is said start address of a block of said video memory and $A_{ddr}$ is said destination address provided by said bus;

(c) obtaining a word of said RGB data from said bus;

(d) initiating a memory cycle to write the first color byte of said RGB data into said video memory using said start address;

(e) sequencing said start address to produce a second address of a second word in video memory;

(f) initiating a memory cycle to write the second color byte of said RGB data into said video memory using said second address; and (g) sequencing said second address to produce a third address of a third word in video memory;

(h) initiating a memory cycle to write the third color byte of said RGB data into said video memory using said third address.

12. The method according to claim 11 further comprising the step of:

(h) repeating steps (a) through (h) for a next destination address provided by said bus and next RGB data.

13. The method according to claim 12, wherein said bus comprises a NUBUS.

14. In a computer providing a video display signal in which red, green and blue (RGB) data is stored in a video memory in a series of words in a chunky planar format in blocks defined by a first word that includes only first color bytes, a second word that includes only second color bytes, and a third word that includes only third color bytes, a method of reading said RGB data from said memory, and providing it to a bus in a bus format in which each word includes a red byte, a green byte, and a blue byte, comprising the steps of:

(a) receiving a source address from said bus for the block of RGB data to be read from video memory;

(b) translating said source address to a start address for said video memory, according to the formula $$N_{start} = 3*(A_{ddr}/4)$$

where $N_{start}$ is said address of a block in said video memory and $A_{ddr}$ is said source address provided by said bus;

(c) initiating a memory cycle at said start address to obtain a first byte of said RGB data from said memory;

(d) sequencing said start address to produce a second address of a second word in video memory;

(e) initiating a memory cycle at said second address to obtain a second byte of said RGB data from said memory; p1 (f) repeating steps (d) and (e) to obtain a third address and a third byte of said RGB data;

(g) presenting said first, second and third bytes to said bus.

15. The method according to claim 14, wherein said bus is a NUBUS.

16. In a computer providing a video signal coupled to a CRT monitior for display thereon, said computer having a NUBUS bus coupling a CPU to a video memory, a method of packing red, green and blue (RGB) video data presented on said NUBUS on a block in said video memory in an efficient manner so as to eliminate vacancies of data in said memory, said method reorganizing said video memory into blocks having a first word, a seocond word, and a third word, and also having bytes lanes defined by bytes in said words, said method comprising the steps of:

(a) calculating a start address for a first word of a block in said memory from a NUBUS address provided by said NUBUS for the destination of the RGB video data;

(b) writing a first byte of said RGB data to an appropriate byte lane of said memory in said first word;

(c) writing a second byte of said RGB data to said appropriate byte lane of said second word of said block of video memory; and (d) writing a third byte of said RGB data to said appropriate byte lane of siad third word of said block of video memory.

17. The method according to claim 16, wherein said start address is calculated in step (a) according to the formula $$N_{start} = (3*NAD(20:2)/4)$$

where $N_{start}$ is said start address of said block in said video memory and NAD is said NUBUS address provided by said bus for the destination of the RGB data.

18. The method of claim 16, further comprising the step of:

(e) repeating steps (a) through (d) until the block is fillled with RGB data, so that the first word in video memory contains data for a first color, the second word contains data for a second color, and third word contains data for a third color.

* * * * *